(12) United States Patent
Bresch et al.

(10) Patent No.: US 8,354,933 B2
(45) Date of Patent: Jan. 15, 2013

(54) TRIGGER SYSTEM FOR MONITORING AND/OR CONTROL DEVICES AND/OR EARLY WARNING SYSTEMS FOR NASCENT AND/OR OCCURRING CYCLONES

(75) Inventors: David Bresch, Zurich (CH); Pamela Koellner-Heck, Liestal (CH); Stefan Wunderlich, Bubikon (CH)

(73) Assignee: Swiss Reinsurance Company Ltd., Zurich (CH)

( * ) Notice: Subject to any disclaimer, the term of this patent is extended or adjusted under 35 U.S.C. 154(b) by 747 days.

(21) Appl. No.: 12/093,861

(22) PCT Filed: Nov. 10, 2006

(86) PCT No.: PCT/CH2006/000633
§ 371 (c)(1),
(2), (4) Date: Nov. 25, 2008

(87) PCT Pub. No.: WO2007/056880
PCT Pub. Date: May 24, 2007

(65) Prior Publication Data
US 2009/0303056 A1    Dec. 10, 2009

(30) Foreign Application Priority Data

Nov. 10, 2006  (CH) ...................................... 0679/05

(51) Int. Cl.
*G01W 1/00* (2006.01)
(52) U.S. Cl. ................... 340/601; 340/539.11; 340/690; 705/36 R; 455/456.3; 455/466; 702/15
(58) Field of Classification Search .................. 340/601, 340/539.11, 690; 455/456.3, 466; 705/36 R; 702/15
See application file for complete search history.

(56) References Cited

U.S. PATENT DOCUMENTS 4,402,672 A * 9/1983 Lowe, Jr. ...................... 434/217
(Continued)

FOREIGN PATENT DOCUMENTS
EP    1 583 013    10/2005
(Continued)

OTHER PUBLICATIONS

Demaria, M. et al., "CIRA Contributions to the Joint Hurricane Testbed", Bringing Science Alive-Cira's Role in S.O.S., pp. 1-16, XP002416262, (2005).

*Primary Examiner* — Benjamin C Lee
*Assistant Examiner* — Quang D Pham
(74) *Attorney, Agent, or Firm* — Oblon, Spivak, McClelland, Maier & Neustadt, L.L.P.

(57) ABSTRACT

An automated trigger device and a corresponding method for dynamic triggering of developing and/or imminent tropical storms for integrated monitoring devices and/or control devices and/or early warning systems. The trigger device includes a trigger module, and measurement devices arranged in cellular, geographically and/or topologically definable units or zones. Geophysical measurement parameters can be transmitted from the measurement devices to the trigger module. By a Monte Carlo module—and based on the measurement parameters—data records can be dynamically generated for definable future time intervals. By an extrapolation module track distribution parameters of a track distribution integrable over the plurality of data records are generated for each of the definable future time intervals. By an activating device—and based on the generated track distribution parameters and/or the trigger parameters—a corresponding control signal is transmitted to the monitoring device.

22 Claims, 16 Drawing Sheets

U.S. PATENT DOCUMENTS

| | | | |
|---|---|---|---|
| 5,440,483 A * | 8/1995 | Badoche-Jacquet et al. | 702/3 |
| 5,517,193 A * | 5/1996 | Allison et al. | 342/26 R |
| 5,628,050 A * | 5/1997 | McGraw et al. | 455/12.1 |
| 5,774,881 A * | 6/1998 | Friend et al. | 705/36 R |
| 5,850,619 A * | 12/1998 | Rasmussen et al. | 702/3 |
| 5,865,628 A * | 2/1999 | Burns | 434/217 |
| 5,963,253 A * | 10/1999 | Dwyer | 348/362 |
| 6,018,699 A * | 1/2000 | Baron et al. | 702/3 |
| 6,023,223 A * | 2/2000 | Baxter, Jr. | 340/531 |
| 6,076,044 A * | 6/2000 | Brown | 702/3 |
| 6,188,960 B1 * | 2/2001 | Baron et al. | 702/3 |
| 6,275,774 B1 * | 8/2001 | Baron et al. | 702/3 |
| 6,278,947 B1 * | 8/2001 | Baron et al. | 702/3 |
| 6,339,747 B1 * | 1/2002 | Daly et al. | 702/3 |
| 6,493,633 B2 * | 12/2002 | Baron et al. | 702/3 |
| 6,535,817 B1 * | 3/2003 | Krishnamurti | 702/3 |
| 6,542,825 B2 * | 4/2003 | Jones et al. | 702/3 |
| 6,654,689 B1 * | 11/2003 | Kelly et al. | 702/3 |
| 6,670,908 B2 * | 12/2003 | Wilson et al. | 342/26 R |
| 7,024,310 B2 * | 4/2006 | Root et al. | 702/3 |
| 7,034,681 B2 * | 4/2006 | Yamamoto et al. | 340/541 |
| 7,049,971 B2 * | 5/2006 | Guillory | 340/601 |
| 7,053,767 B2 * | 5/2006 | Petite et al. | 340/531 |
| 7,084,775 B1 * | 8/2006 | Smith | 340/601 |
| 7,139,664 B2 * | 11/2006 | Kelly et al. | 702/3 |
| 7,181,345 B2 * | 2/2007 | Rosenfeld et al. | 702/3 |
| 7,202,795 B2 * | 4/2007 | Karamanian et al. | 340/601 |
| 7,254,484 B2 * | 8/2007 | Jantunen et al. | 702/4 |
| 7,327,271 B2 * | 2/2008 | Greenstein et al. | 340/601 |
| 7,359,799 B2 * | 4/2008 | Bresch et al. | 702/3 |
| 7,411,513 B1 * | 8/2008 | Karamanian et al. | 340/601 |
| 7,424,399 B2 * | 9/2008 | Kahn et al. | 702/188 |
| 7,584,133 B2 * | 9/2009 | Horowitz | 705/36 R |
| 7,584,134 B2 * | 9/2009 | Horowitz | 705/36 R |
| 7,593,883 B2 * | 9/2009 | Horowitz | 705/36 R |
| 7,605,687 B2 * | 10/2009 | Morris | 340/384.73 |
| 7,734,245 B2 * | 6/2010 | Ravela et al. | 434/8 |
| 7,752,106 B1 * | 7/2010 | Corby et al. | 705/35 |
| 7,774,256 B1 * | 8/2010 | Ryan et al. | 705/36 R |
| 7,809,507 B2 * | 10/2010 | Dwyer et al. | 702/4 |
| 7,872,574 B2 * | 1/2011 | Betts et al. | 340/539.26 |
| 8,224,768 B1 * | 7/2012 | Crawford et al. | 706/62 |
| 2001/0052847 A1 * | 12/2001 | Auerbach | 340/540 |
| 2002/0075155 A1 * | 6/2002 | Guillory | 340/601 |
| 2003/0004780 A1 * | 1/2003 | Smith et al. | 705/10 |
| 2003/0061015 A1 * | 3/2003 | Ben-Gal et al. | 703/2 |
| 2003/0120426 A1 * | 6/2003 | Baron et al. | 702/3 |
| 2003/0139906 A1 * | 7/2003 | Barford | 702/183 |
| 2004/0011881 A1 * | 1/2004 | Morales | 239/2.1 |
| 2004/0043760 A1 * | 3/2004 | Rosenfeld et al. | 455/414.3 |
| 2004/0064255 A1 * | 4/2004 | Egi | 702/3 |
| 2004/0068496 A1 * | 4/2004 | Bergman et al. | 707/4 |
| 2004/0078809 A1 * | 4/2004 | Drazin | 725/34 |
| 2005/0027645 A1 * | 2/2005 | Lui et al. | 705/38 |
| 2005/0049789 A1 * | 3/2005 | Kelly et al. | 702/3 |
| 2005/0216386 A1 * | 9/2005 | Klugman | 705/35 |
| 2005/0222770 A1 * | 10/2005 | McKewon et al. | 702/3 |
| 2006/0267783 A1 * | 11/2006 | Smith | 340/601 |
| 2007/0050142 A1 * | 3/2007 | Posey et al. | 702/3 |
| 2007/0185653 A1 * | 8/2007 | Bresch et al. | 702/3 |
| 2007/0221743 A1 * | 9/2007 | Weinzapfel et al. | 239/14.1 |
| 2007/0223841 A1 * | 9/2007 | Weinzapfel et al. | 382/325 |
| 2008/0126025 A1 * | 5/2008 | Seppanen et al. | 703/2 |
| 2008/0133430 A1 * | 6/2008 | Horowitz | 705/36 R |
| 2008/0228605 A1 * | 9/2008 | Wang | 705/30 |
| 2008/0288417 A1 * | 11/2008 | Luessi et al. | 705/36 R |
| 2009/0063236 A1 * | 3/2009 | Pennay | 705/8 |

FOREIGN PATENT DOCUMENTS

| | | |
|---|---|---|
| WO | 2005 083471 | 9/2005 |

* cited by examiner

Pioneer Index für IVAN = 0.0

Pioneer Index für IVAN = 2.0

Pioneer Index für IVAN = 408.0

Pioneer Index für IVAN = 2322.0

Pioneer Index für IVAN = 218.0

Pioneer Index für IVAN = 476.0

Pioneer Index für IVAN = 392.0

Pioneer Index für IVAN = 460.0

Pioneer Index für IVAN = 368.0

Pioneer Index für IVAN = 588.0

Pioneer Index für IVAN = 547.0

Pioneer Index für IVAN = 701.0

Pioneer Index für IVAN = 439.0

Pioneer Index für IVAN = 410.0

Pioneer Index für IVAN = 530.0

Pioneer Index für IVAN = 528.0

Pioneer Index für IVAN = 528.0

Pioneer Index für IVAN = 528.0

Wahrscheinlichkeit, dass FRANCES innerhalb eines Radius
von 120 km innerhalb der nächsten 120 Stunden am
bezeichneten Ort durchgehen wird. (Tracks: schwarz=OPER,
grün=CTRL, blau=EPS Nummern an den beobachteten
Positionen zur Zeit t + h (20040831 00 UTC))

TCNA 20040906 12Z IVAN
Analysiert/Main: schwarz,
Control: blau (grau)

Pioneer Index
(Max. Pioneer Index
0.000000)

TCNA 20040907 12Z IVAN
Analysiert/Main: schwarz,
Control: blau (grau)

Pioneer Index
(Max. Pioneer Index
2.000000)

TCNA 20040908 12Z IVAN
Analysiert/Main: schwarz,
Control: blau (grau)

Pioneer Index
(Max. Pioneer Index
21.000000)

TCNA 20040910 12Z IVAN
Analysiert/Main: schwarz,
Control: blau (grau)

Pioneer Index
(Max. Pioneer Index
59.000000)

TCNA 20040911 12Z IVAN
Analysiert/Main: schwarz,
Control: blau (grau)

Pioneer Index
(Max. Pioneer Index
292.000000)

TCNA 20040912 12Z IVAN
Analysiert/Main: schwarz,
Control: blau (grau)

Pioneer Index
(Max. Pioneer Index
375.000000)

TCNA 20040914 12Z IVAN
Analysiert/Main: schwarz,
Control: blau (grau)

Pioneer Index
(Max. Pioneer Index
594.000000)

TCNA 20040915 12Z IVAN
Analysiert/Main: schwarz,
Control: blau (grau)

Pioneer Index
(Max. Pioneer Index
588.000000)

TRIGGER SYSTEM FOR MONITORING AND/OR CONTROL DEVICES AND/OR EARLY WARNING SYSTEMS FOR NASCENT AND/OR OCCURRING CYCLONES

FIELD OF INVENTION

The present invention relates to an automated trigger device and a corresponding method based on feedback, time-dependent trigger parameters and/or measurement parameters for the dynamic triggering of developing and/or imminent tropical storms for integrated monitoring devices and/or control devices and/or early warning systems, which include at least means for generating and transmitting an activating pulse if one or more trigger parameters is/are exceeded.

BACKGROUND OF INVENTION

Every year tropical storms, so-called cyclones such as hurricanes, typhoons and other types of storms, cause an immense amount of damage to industry, humans and nature in many parts of the world. In particular, the insidious effect of climate change has been manifested in recent years in an increased occurrence of this phenomenon. These catastrophes not only have an impact on the stability of financial markets (stock market volatility, etc.), but can affect the expected economic growth of a whole country, as the recent environmental catastrophe resulting from the widespread flooding of New Orleans has once again illustrated so graphically. The importance of risk management and appropriate measures for handling such risk events and catastrophes has therefore in recent years achieved a hitherto unexpected importance as regards general economic activity, since a large proportion of business turnover and a considerable percentage of jobs and places of work can be threatened. Especially in the insurance and reinsurance sector there is a long-recognised demand for technical automation and improvement in many areas. The establishment of the world wide web and the resultant possibility of being able to access vast amounts of decentralised data have in these areas additionally placed completely new demands on industry, which likewise also have to be met.

The survival of a whole branch of industry can depend for example on being able to analyse the relevant data rapidly and reliably, so as to be able to introduce and/or implement the appropriate measures in an automated manner.

Although the phenomenon of tropical storms has been known for a long time, industry is still struggling to handle them technically and make accurate determinations and/or predictions of relevant factors. Most tropical storms occur on account of favourable water temperatures within a zone lying between latitude 25° south and 25° north (see FIG. 2). Since the Coriolis force, i.e. the deflecting force of the Earth's rotation, is sufficiently strong only starting from latitude 5° north and latitude 5° south to initiate a rotational movement of cyclones, the equatorial region is in principle excluded as a formation zone for tropical storms. In the suitable zones the formation of a tropical storm is additionally assisted by the inner tropical convergence zone (ITC). The ITC provides suitable conditions for rising air masses and strong convection, since in this zone the two trade winds impact one another close to the surface (convergence). At a height of ca. 12-15 km the air masses after rising diverge once again (height divergence). Tropical storms occur very rarely in the south Atlantic and in the south-east Pacific, since here the cold ocean currents, namely the Benguela and Humboldt currents, cool the tropical oceans significantly, with the result that the necessary water temperature of at least 26.5° C. is seldom reached. On 26 Mar. 2004 the only tropical storm to have occurred up to that time in the south Atlantic was observed off the coast of Brazil. In the Mediterranean storms are sometimes observed that are similar to tropical storms.

Basically seven storm formation regions can be distinguished: North Atlantic: (i) Caribbean, Gulf of Mexico, USA, Canada, Mexico; (ii) North-east Pacific: Hawaii, Mexico, USA: (iii) North-west Pacific: Philippines, Taiwan, China, Japan, many islands; (iv) North Indian ocean: Gulf of Bengal, Arabian Sea, India: (v) South-west Pacific: Eastern Australia; (vi) Southern Indian Ocean: Western Australia; (vii) South-west Indian Ocean: Madagascar, East Africa.

The first development stage of a tropical storm occurs when an interference extending over a large area and triggering convection, for example an easterly wave or a low-pressure area outside the tropics located over sufficiently warm water, meets sufficiently moist air masses under favourable shear conditions. A self-maintaining reaction can be triggered under such conditions. The convection associated with the occurrence of this phenomenon is an important feature. The heat released by the condensation in addition accelerates the rising air mass. A reduced pressure, i.e. a depression, is thereby produced on the surface of the water. The entrained air masses flowing from underneath satisfy the same criteria and are likewise accelerated. However, the chain process is not yet triggered automatically by itself, since otherwise of course tropical storms would also be produced by large thunderstorms in our latitudes. In addition, the air masses flowing from all sides into the convection region characterised by low pressure (low level inflow) start at the relatively friction-free water surface due to the Coriolis force, and circulate about a rotation centre. A LLCC (low level circulation centre) is formed.

This circulation now additionally organises and supports the convection. Due to the rotation even more air can rise. In addition the rotation prevents the entrained air masses being able to compensate the reduced pressure in the centre. The rotation thus assists the self-maintenance of the low pressure in the rotation centre. The faster the tropical storm rotates, the more warm, moist air undergoes condensation. When the air has released sufficient moisture it no longer rises, and moves away sideways at this height from the rotation centre (high level outflow). The resultant system now intensifies still further so long as the conditions allow this.

If the development conditions are optimal, an intensification up to an upper limit takes place. This upper limit cannot be exceeded since the surface friction and other factors produce a braking effect. The record is held by hurricane Tipp, with a core pressure of 870 hectopascals and a diameter of 2200 km. On average tropical storms reach a diameter of 500-700 km. Accordingly, they are significantly smaller than low-pressure systems outside the tropics. If the tropical storm rotates sufficiently quickly, an eye of the storm can then form. The eye is a relatively cloud-free, low wind speed region around the rotation centre, in which cold dry air sinks from above. The diameter of an eye can be up to 50 km. The eye is surrounded by high cumulus clouds, the so-called eyewall. A tropical strom reaches the highest wind velocities in the region of this eyewall.

Since the storm also has an additional intrinsic movement, which is also added to the rotational velocity, the main wind field is always on the side where the rotation and the intrinsic movement point in the same direction.

For example, if a cyclone rotates anticlockwise in the northern hemisphere with a rotational velocity of 200 km/hour coupled with an intrinsic velocity of 30 km/hour northwards, then the total velocity at the eastern eyewall is 230 km/hour. On the western side however the velocity is only 170 km/hour, since here the intrinsic movement is acting of course against the rotational movement.

Tropical storms move at different velocities: at lower latitudes they move at velocities of 8 to 32 km/hour, while at higher latitudes they move at velocities of up to 80 km/hour. Tropical storms can move up to 3.6 million tons of air. In both hemispheres cyclones first of all generally move in a westerly direction and then turn in a parabolic path eastwards. In the northern hemisphere the pattern is as a rule the following: W NW N NE. At some time they then leave the region of favourable conditions and weaken, either due to contact with land (landfall), with cold water, dry air masses, or on account of too high shear forces. If tropical storms reach the frontal zone of the middle latitudes, they can be transformed into an extratropical low-pressure system (extratropical transition). Tropical storms are generally classified according to the Saffir-Simpson scale. The criterion is the highest mean wind velocity: tropical depression: up to 60 km/hour, tropical storm: 62 to 117 km/hour, category 1: 118 to 153 km/hour, category 2: 154 to 178 km/hour, category 3: 179 to 210 km/hour, category 4: 211 to 249 km/hour, category 5: 250 km/hour and above.

Depending on the formation region, tropical storms also have various additional designations. The official designations of tropical storms (also tropical cyclones) are hurricane (North Atlantic, North Pacific to the east of the international date line and South Pacific to the east of 160° E.), typhoon (North Pacific west of the international date line), and tropical cyclone in all other regions. As already mentioned, tropical storms are classed as natural catastrophes since they can give rise to a very wide range of dangerous situations that can seriously threaten industry, humans and nature. The highest death toll occurred following a cyclone in 1970 in Bangladesh, where around 300,000 people died. The greatest amount of material damage was probably that caused by the 2005 cyclone which struck land at New Orleans. Cyclones with wind gusting to more than 350 km/hour are possible. At these speeds even solidly built structures are threatened. In addition a precipitation of more than 500 mm in a single day can occur. These enormous amounts of rain can trigger among other things devastating land slides and major flooding. Also, waves more than 20 m high occurring in a cyclone can threaten shipping as well as coastal regions and islands. Finally, tornadoes are a common secondary feature of tropical storms and denote small-volume air vortices. They are formed in the thunderstorms surrounding tropical storms. Generally they are waterspouts, though on landfall tornadoes also occur over land. They can also cause further devastation.

Industry and the economy, especially the insurance industry, have over the last ten years been particularly badly affected by natural catastrophes, which have reached new levels in terms of the extent and intensity of damage caused by such catastrophes. Hurricane "Fran" alone, which struck the south-east of the USA in September 1996, caused damage totalling $1.6 milliard (thousand million). According to analyses made by the Swiss Reinsurance Company, damage due to catastrophes before 1989 was around 0.2% of the gross domestic product (GDP), but since then has risen to more than 0.4% (per annum). In 1992 losses—triggered by hurricane "Andrew"—reached a maximum of $22.5 milliard or 1.2% of the GDP of the considered reference countries.

The question therefore arose as to whether the insurance industry is capable on the basis of the conventional damage cover systems of dealing with potential mega catastrophes such as could occur in a repetition of the San Francisco earthquake (1906) or hurricane Andrew (1992), etc. The possible losses simply due to hurricanes or earthquakes in the USA probably currently exceed the available insurance capacity of the direct and re-insurance market of ca. $100 milliard. These losses are however less than the daily average fluctuations in value of the US financial market. For example, the market capitalization of the financial markets in the USA in 1998 was more than $20 billion (million million) and the daily average fluctuation range was 70 base points or $133 milliard based on 1995 base values, which is substantially more than the maximum possible potential loss due to a catastrophic earthquake.

It was therefore obvious to try and find alternative methods of risk transfer and if possible integrate them into existing systems: the liquid financial markets in particular with their capacity and their diversification potential are obvious candidates. The industry has therefore in recent years developed ever newer products for the transfer of these risks. Damage cover systems with an, if possible, non-correlated partial risk hedge or exclusion system based on capital markets, so-called insurance-linked securities (ILS), have been known since the middle of the 1990s and currently have a capitalization of eight to ten milliard US dollars, which is a clear indication of the great success of these systems. In 1992 the Chicago Board of Trade introduced the CAT futures and in 1996 the PCS options. The latter derivatives are based on the Property Claim Services Inc. index, which is a damage index that represents the development of previously defined catastrophe damage and large-scale damage. Since 1994 individual transactions (OTC) have been structured on insurance risks for investors. A variant of this OTC business is the writing of options by investors for the insurance company. With a Cat (catastrophe) event securities are then issued to investors in exchange for liquid assets in order to refinance the losses resulting from the catastrophe.

With contingent surplus notes the insurer can sell loans or bonds to a previously agreed options seller, in order to improve their liquidity. With the alternative device of contingent equity (catastrophe equity put), here the insurer can "refresh" their equity capital by issuing new shares at a previously agreed price. In particular however the "catastrophe bond" is suitable as an OTC instrument for the conventional capital investor wishing to transfer risks and diversify his portfolios. A catastrophe bond (CatBond, Act-of-God-Bond) is a financing instrument for a reinsurance, in which the loan purchaser accepts all or part of the risk of the insurance. The development of the CatBond market is the result of various innovative direct insurance and reinsurance companies (e.g. USAA, SwissRe, Zurich/Centre Re and The St. Paul), which have sought to find capital market solutions that allowed a better consistency in the capacity and in the assessment and evaluation of reinsurance, and that provided new or rarely obtainable types of contracts.

Three parties are involved in the typical structuring (see FIG. 3) of a CatBond. The first party is a direct insurer, who would like to purchase the reinsurance cover. For this a special purpose vehicle (SPV) is generally created, which on the one hand "writes" the reinsurance and on the other hand refinances this via the issue of CatBonds. The SPV then sells the CatBonds to the investors and thereby transfers the insurance risk. In the typical basic structure of a CatBond the SPV issues bonds with a nominal value of at least the contract sum of the reinsurance contract. In some cases the value of the issue exceeds the value of the reinsurance, in order to make it possible to create "constructions" with a guaranteed capital repayment.

The proceeds of the issue are managed in trust by the SPV and are generally invested through a trust in government bonds or stocks. If no "trigger event" previously defined in the conditions of the CatBond, i.e. no natural catastrophe of sufficient magnitude occurs, then the investor receives all the periodic interest payments as well as the repayment of their nominal capital on expiry of the term of the bond. If a Cat event occurs the investor loses all or part of their investment, since the SPV is used to dispose of their assets in order to cover their liabilities from the reinsurance contract. The extent of the loss depends on the structuring of the bond. The raising of capital by the issuing of the bond is subject to variously high capital provision charges, which have to be taken into account in comparison with reinsurance contracts. The direct insurer pays the insurance premium to the SPV for the reinsurance cover purchased from the SPV company. This premium serves, together with the receipts from the proceeds of the issue, to cover the costs of the SPV and the interest payments on the CatBond. In this connection the event can be coupled to the portfolio of a specific insurance, but can also be coupled to a specific damage event or to an index. In this way the investor can more easily adjust the payments, although coupling to information available in the public domain is generally better.

In the at-risk structure the nominal capital of the bond and the interest payments are fully exposed to the risk of the catastrophe. This structure represents the "pure" CatBond and was used hitherto in the majority of bond issues. In partially-defeased instruments on the other hand a part of the issue volume is placed in zero coupon loans so that the secured part of the nominal capital can also be repaid in the event of a catastrophe. The unsecured part and the yield from the secured part are available to cover the catastrophe damage. The total volume of the issue will in this case exceed the amount of the underlying reinsurance contract.

The opposite of the pure CatBond is the principal-protected structure. Here the repayment of the total amount is guaranteed, although the interest payments are exposed to the risk. The repayment is made possible by extending the term of the bond. The interest from the assets of the trust can therefore be used to build up the capital for the repayment.

An essential aspect of CatBonds as regards cyclones is predicting their physical and geographical course, the so-called track, from the time of their formation. Industry has developed a very wide range of methods and systems for reliably determining their course. Despite the enormous efforts that have been made in this field in recent years, there are still however no systems in the prior art that even approximately satisfy the relevant requirements. Several of the methods of the prior art use inter alia special indices that reproduce the risk of a landfall of a cyclone and the damage associated therewith. The so-called Pioneer index is one of these indices.

The financial markets, but particularly of course the Cat-Bonds, generally react extremely sensitively to fluctuations in these indices, and this even before the actual damage has occurred. If for example such an index indicates that within the next few days there is a very high probability of a landfall for a specific cyclone, with high associated damage, then the CatBonds associated with the corresponding cover systems will immediately lose value, and more specifically correlated to the risk indices determined by the systems.

In the prior art all these indices are based on a track prediction or track determination, generally the most probable one. One also speaks of a "deterministic track forecast". The deterministic track forecast method consists in determining a predicted track that is associated with a single intensity centre. In such methods no kind of statistical information is available concerning the predetermined track, although in general a qualitative range for a possible deviation is specified for the track (see FIGS. 4/5). The potential track region is based not on further simulations, but is in each case obtained simply by a forwardly directed, timewise broadening of the determined track.

FIGS. 5 to 22 show the considerable fluctuations of such an index. The already mentioned Pioneer index is shown here as an example. Not only are the fluctuations of the indices a problem in the prior art, but also the fact that the index calculation based on the deterministic track determination or the track itself does not include any information on its reliability and/or accuracy. The problem is all the more serious since we are dealing with a chaotic system. This means that the slightest changes in the boundary conditions of the model parameters can already have huge (non-linear) effects on the Pioneer index determined therefrom.

For example, in the case of cyclone Ivan on 10 Sep. 2004 the Pioneer index showed an enormous value of 2322 (without giving any indication as to how reliable this value was), whereas on the next day the index had a value of only 218. The final value was 528 (FIG. 22). The uncertainty and disadvantages not only for whole sectors of industry, but also for the financial markets, due to such trigger values of the prior art is now clear from the above discussion.

SUMMARY OF INVENITON

An object of the present invention is to provide a trigger device that does not have the disadvantages mentioned above. In particular, all the information should always be able to be dynamically evaluated and taken into account by the trigger device, so as to meet current demands placed on monitoring, control and/or early warning devices. For the special case of damage cover systems the solution according to the invention should in addition enable one-stage and/or multi-stage systems for damage cover to be configured in such a way that by means of an automated coupling to the capital market, an uncorrelated connection (bond) exists, which can also be appropriately monitored in an automated manner and if necessary altered. In addition the monitoring device should ensure a reliable, stable monitoring of developing and/or imminent tropical storms.

According to the present invention this object is achieved in particular by the features of the independent claims. Further advantageous embodiments also follow from the dependent claims and the description.

In particular these objects are achieved by the invention in that, for the dynamic triggering of developing and/or imminent tropical storms for integrated monitoring devices and/or control devices and/or early warning systems, the trigger device comprises at least means for generating and transmitting an activating pulse if one or more trigger parameters is/are exceeded, that the trigger device includes a trigger module with a network interface, wherein the trigger module is connected via the network interface to measurement devices distributed in a decentralised manner, that the measurement devices are arranged in cellular, geographically and/or topologically definable units or zones and by means of the network interface geophysical, atmospheric and/or maritime measurement parameters can be transmitted from the measurement devices to the trigger module and stored, that the trigger module includes a Monte Carlo module, wherein by means of the Monte Carlo module and based on the transmitted measurement parameters a plurality of data records for definable future time intervals can be dynamically generated, which data records include physical and/or geographical parameters of a tropical storm, that the trigger module includes an extrapolation module for generating and storing track distribution parameters of a track distribution integrable over the plurality of data records for each of the definable future time intervals, wherein the track distribution includes each of the cellular units, and in that the trigger device, for example the trigger module or the monitoring/control device, includes an activating device by means of which, based on the generated track distribution parameters and/or the trigger parameters, a corresponding control signal can be transmitted to the monitoring device. The trigger module can for example include means for determining the data records on the basis of air pressure parameters and/or cellular air pressure parameters and/or interpolated cellular air pressure parameters and/or trajectory parameters and/or stochastic parameters. The data records can include for example geographical and/or topological parameters. The measurement devices can include for example measurement sensors that are connected to the measurement device via an air interface or a fixed wired interface or via an interface provided with contacts. The measurement sensors may for example include sensors for measuring water and/or air temperatures. The invention has inter alia the advantage that a reliable trigger device for monitoring systems, control systems and/or early warning systems is obtained. Compared to the prior art a determination of trigger parameters is now possible for the first time, which can always utilise the full range of existing or accessible information. The system has inter alia also the advantage that it can dynamically use the information, which is all the more important in complex, chaotic processes such as tropical storms. The behaviour of the monitoring device, control device and/or early warning system thus also becomes stable. In particular the trigger module and monitoring device are at all times based on the total available information, i.e. are based on a quantitative determination of the trigger parameters.

In one variant of implementation the transmission of the measurement parameters from the measurement devices to the trigger module takes place periodically and/or on request by the trigger module. The transmission to the trigger module can for example also take place if predefinable threshold values are exceeded. This embodiment has inter alia the advantage that the trigger module can react dynamically and instantaneously to changed conditions.

In another variant of implementation the trigger device can include means for dynamically varying boundary condition parameters based on the respective transmitted measurement data. This embodiment has inter alia the advantage that the generation of the data records can take into account dynamically current measurement data. This can also take place without disregarding already generated data records in the triggering.

In a further variant of implementation the track distribution parameters can include a definable probability parameterization via the cellular units. This embodiment has inter alia the advantage that various topological and/or geographical properties can be taken into account and the functioning of the trigger device can be appropriately optimised and/or adapted.

In one variant of implementation the monitoring device comprises means for triggering multi-stage damage cover systems, which multi-stage damage cover systems include at least a second stage based on sums of money transmitted from user units and stored in a memory unit, which can be activated if a predefined damage limit threshold value is exceeded. This embodiment has inter alia the advantage that a completely automated triggering becomes possible for the first time in such damage cover systems.

In a further variant of implementation the activating device includes at least one determinable threshold value, wherein if the at least one threshold value is exceeded by one and/or cumulative trigger parameters, account data including account parameters for crediting and/or debiting sums of money can be transmitted by means of the activating device in an automated manner to a clearing module. The invention has inter alia the advantage that the system makes possible for the first time an actual reliable automation. The clearing module itself can include for example a feedback to financial markets and/or stock market parameters, wherein the transmission takes place in addition based on the behaviour of the financial market or stock market parameters.

In another variant of implementation, in the case of sums of money transferred from user units by the clearing module these sums can be recorded at least in part by means of the system and can be allocated to the monitoring device or made available to another user. The invention has inter alia the same advantages as the preceding ones. In this connection for example stored parameters based on allocated CatBond values can be released or new parameters can be allocated.

In a further variant of implementation the monitoring device comprises a user profile based on stored user information, wherein by means of the monitoring device user data can be generated based on the trigger parameters and can be selected based on the user profile, and the user data can be transmitted from the monitoring device via a network to a communications device of a user. The user profile can for example be at least partly dynamically generated, wherein parts of the data of the user profile can be modified by the user and the user profile is stored, permanently allocated to a user, in the monitoring device. Similarly, the user data can for example be at least partly dynamically generated, in which the dynamic generation takes place at least partly based on the data of the user profile. The invention has inter alia the advantage that the system can collect and record dynamically or partly dynamically user behaviour and requirements and can be correspondingly optimised and/or adapted.

In one variant of implementation the activating device includes at least one determinable threshold value, in which if the at least one threshold value is exceeded by one and/or cumulative trigger parameters, the user data can be transmitted from the monitoring device to one or more communications devices of users. The invention has inter alia the advantage that users, in particular mobile users of the system, can react quickly to fluctuations in the indices and can initiate appropriate responses in the financial markets and stock markets.

In another variant of implementation automated payment parameters for transferred sums of money can be allocated by means of the monitoring device, on the basis of the transmitted trigger parameters and at least one threshold value, to the second stage of damage cover systems of a user unit. The invention has inter alia the advantage that the user units of the second stage of the damage cover system can be reimbursed in an automated manner based on the trigger indices.

In one variant of implementation the trigger module is configured in a decentralised manner as an independent network unit, wherein the monitoring device includes means for periodically accessing and/or accessing on request and/or accessing after predefined time intervals, the trigger module via the network. The invention has inter alia the advantage that the monitoring device is constantly updated. This is in particular a further step in the complete automation of the system.

In a further variant of implementation the monitoring device includes various user profiles for various communications devices of the user, stored in an allocated manner, in which the data of the user profiles can be determined at least in part by the user. In addition the user profile can for example include data accessing conditions, by means of which the monetary value of a credit limit that can be set by the user and/or by the monitoring device can be detected, and up to which credit limit the account parameters for crediting and/or debiting sums of money can be transmitted in an automated manner to the clearing module. The invention has inter alia the advantage that the user receives personalized data that can be specified by him.

At this point it should be said that the present invention relates, in addition to the method according to the invention, also to a system for implementing this method and to a corresponding computer program product.

Variants of implementation of the present invention are described hereinafter with the aid of examples. The examples of the embodiments are illustrated by the following accompanying drawings, in which:

BRIEF DESCRIPTION OF THE DRAWINGS

FIGS. 5 to 22 show only a selection, though at least one image per day. The resulting Pioneer index (a trigger index according to the prior art) at the relevant time is also shown. The black line shows the observed track position plus 72 hours. The different shades of grey show the wind speed (meters/sec). The first track image was published on 5 Sep. 2004, and the last but one on 18 Sep. 2004. The last figure shows the final cyclone track of 24 Sep. 2004. The second landfall no longer affected the Pioneer index since the cyclone had already become too weak.

DETAILED DESCRIPTION

Figure 1:
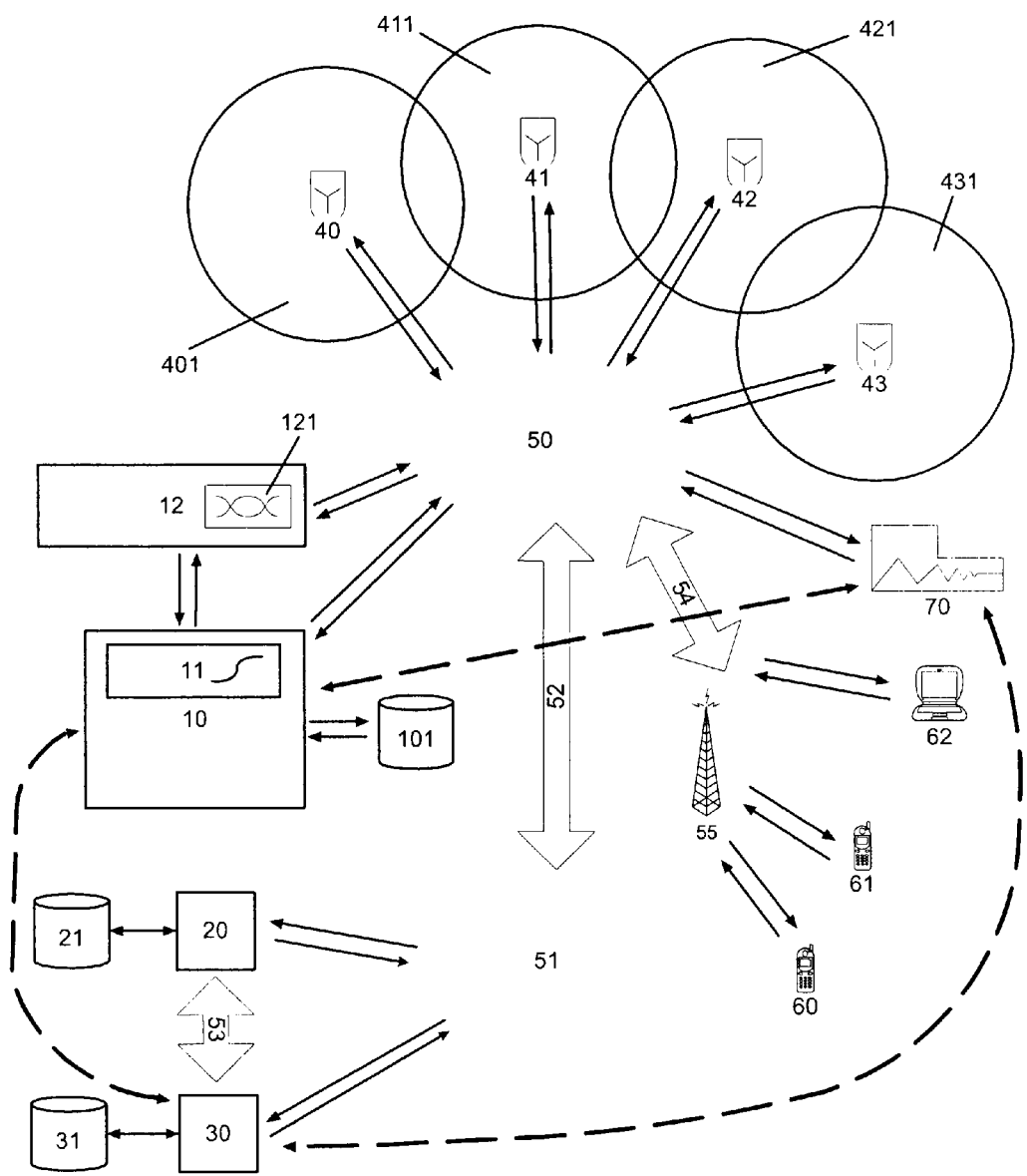
FIG. 1 shows a block diagram that diagrammatically illustrates an embodiment of an automated trigger device according to the invention based on feedback time-dependent trigger parameters for the dynamic triggering of developing and/or imminent tropical storms for integrated monitoring devices and/or control devices and/or early warning systems 10.
Figure 2:
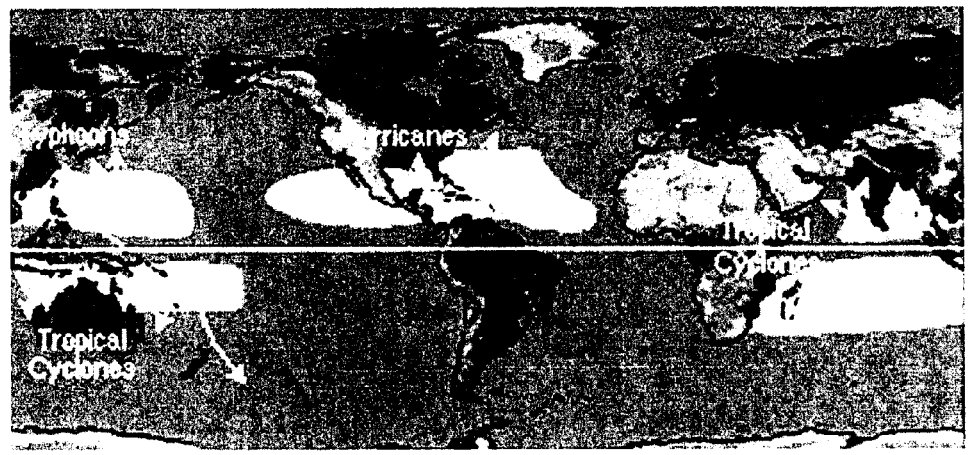
FIG. 2 is a general view of the geographical regions of occurrence of various cyclones. The equatorial region itself is excluded, since only starting from a certain distance from the equator is the Coriolis force sufficiently powerful to trigger tropical storms.
Figure 3:
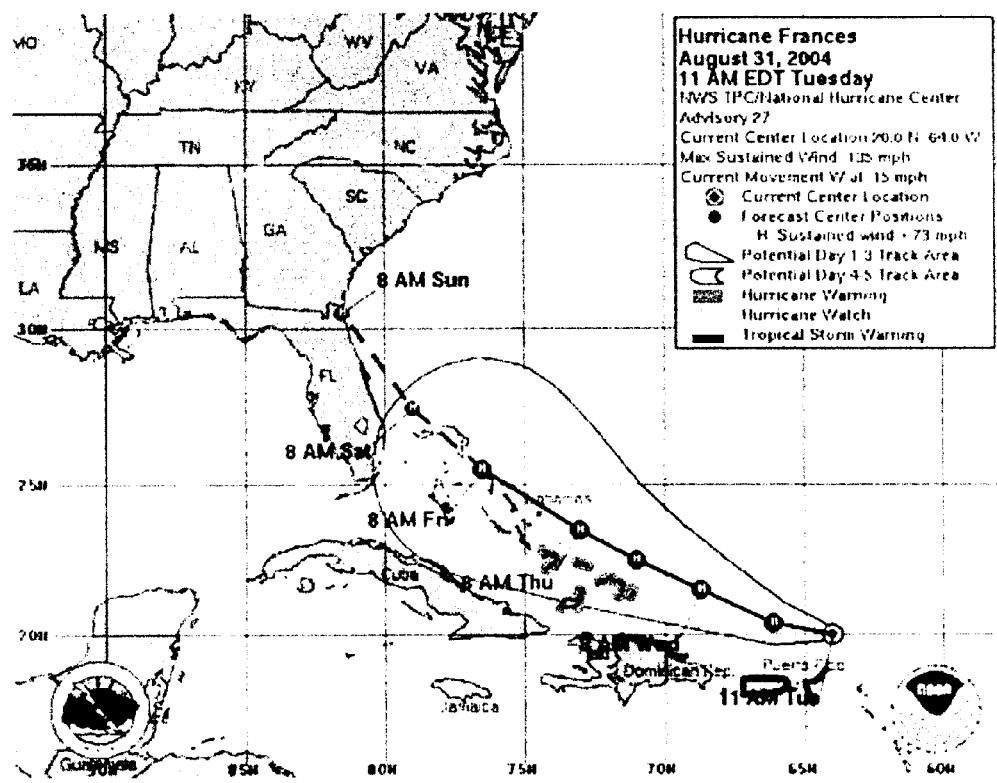
FIG. 3 illustrates an example according to the prior art of a deterministic track prediction, which was published on 31 Aug. 2004. The potential track area is in this connection not based on simulations, but is obtained simply by enlarging the possible area in the time direction (qualitative enlargement). No detailed determination of the track position and/or determination of the intensity is possible in this case.
Figure 4:
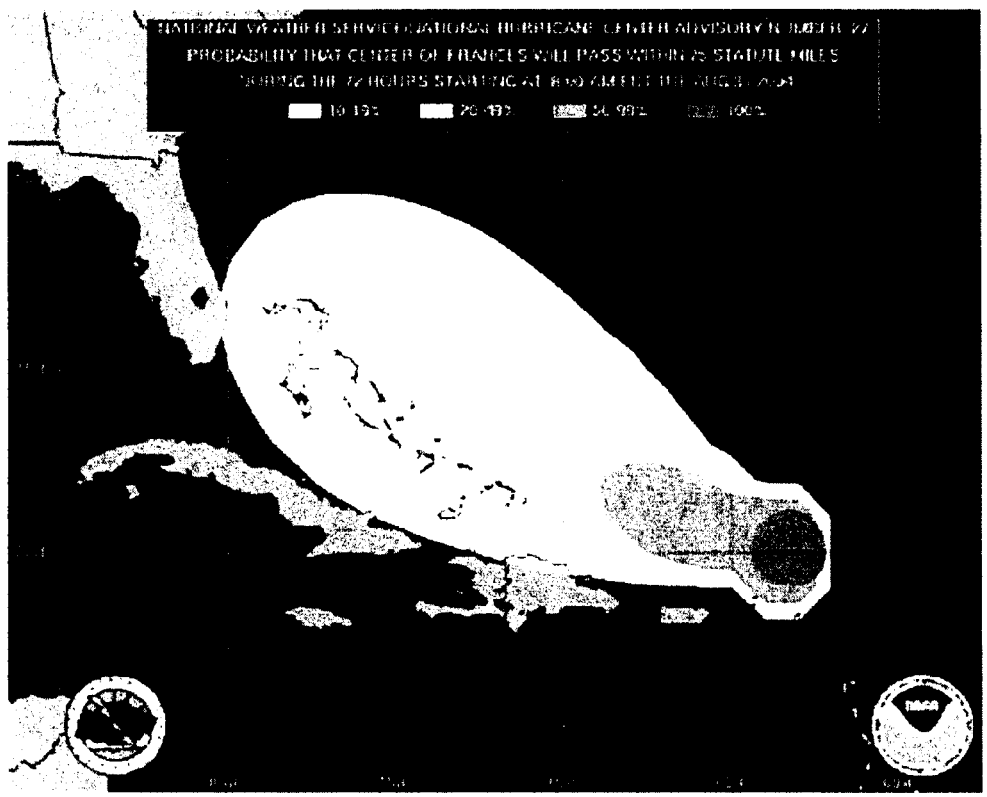
FIG. 4 shows an impact probability map according to the prior art for hurricane Ivan, published on 31 Aug. 2004. Here too it is immediately clear that the map was generated not on the basis of simulations, but simply by enlarging the possible area in the time direction (qualitative enlargement). Again, no detailed determination of the track position and/or determination of the intensity is possible.
Figure 5:
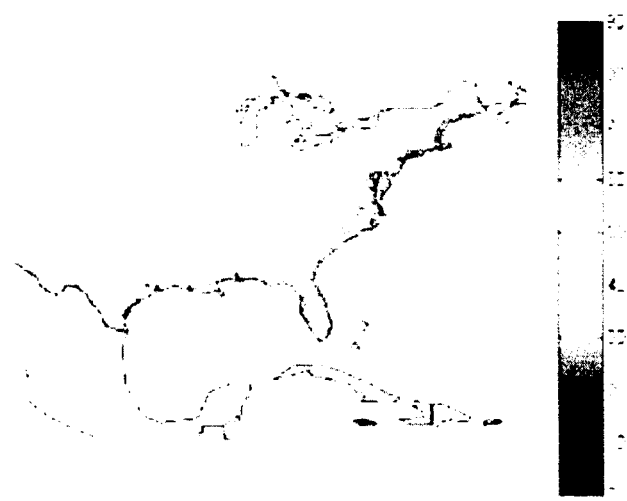
FIGS. 5 to 22 show a time sequence according to the prior art of deterministic track predictions for cyclone Ivan. A new track prediction was published about every six hours. The aforementioned
Figure 6:
Figure 7:
Figure 8:
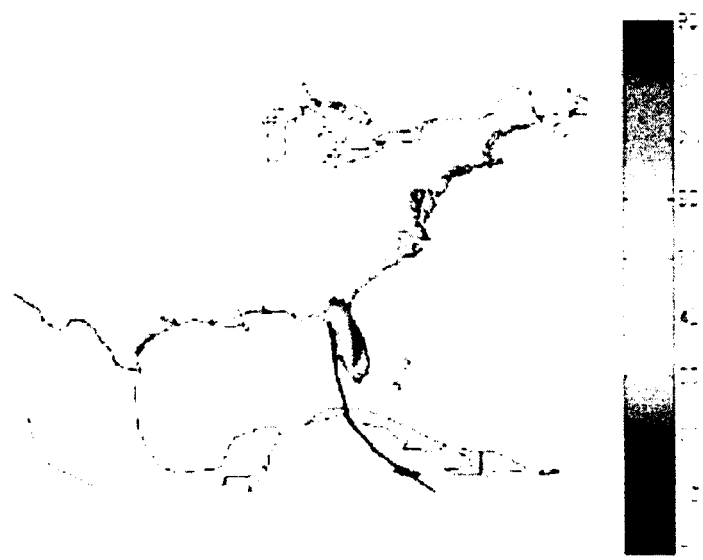
Figure 9:
Figure 10:
Figure 11:
Figure 12:
Figure 13:
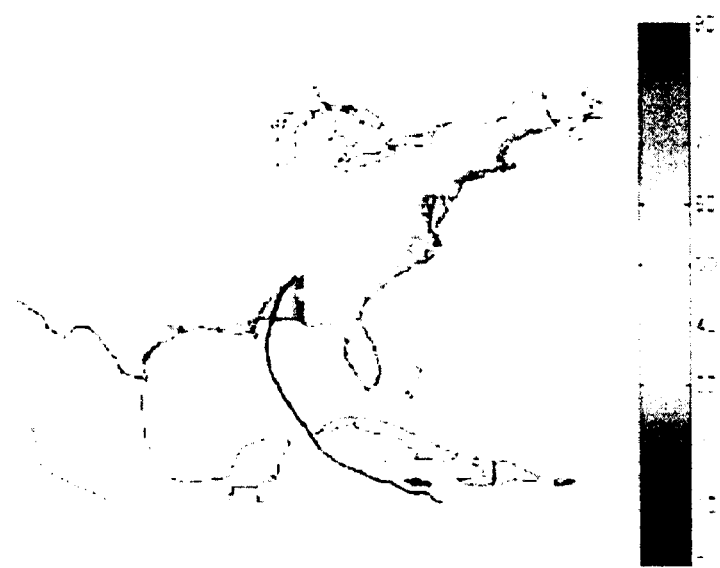
Figure 14:
Figure 15:
Figure 16:
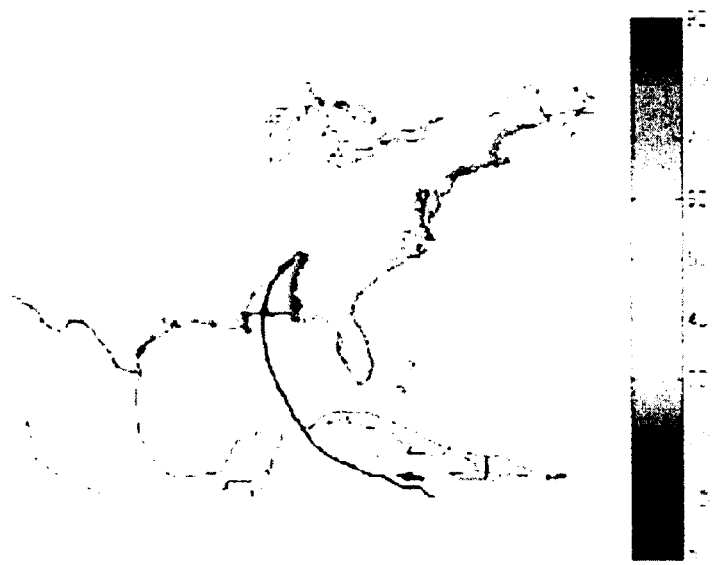
Figure 17:
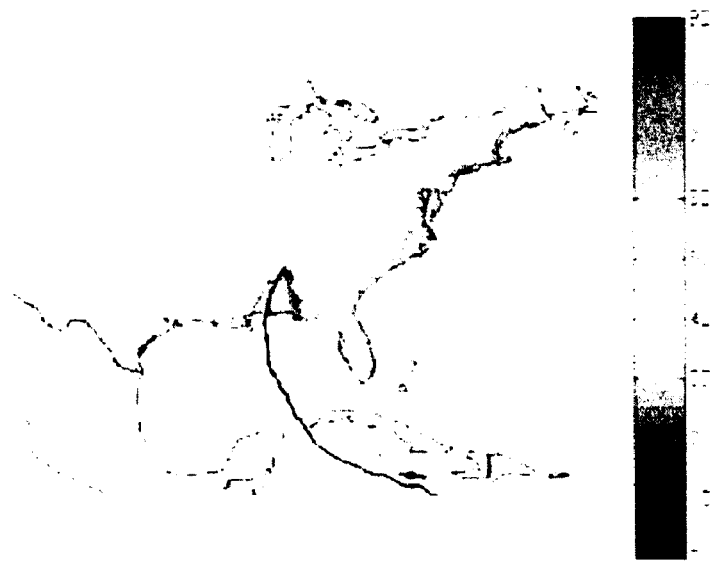
Figure 18:
Figure 19:
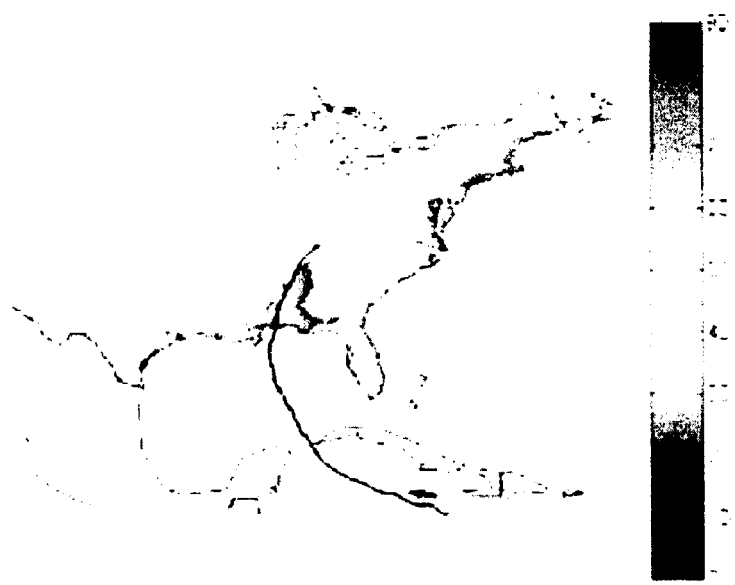
Figure 20:
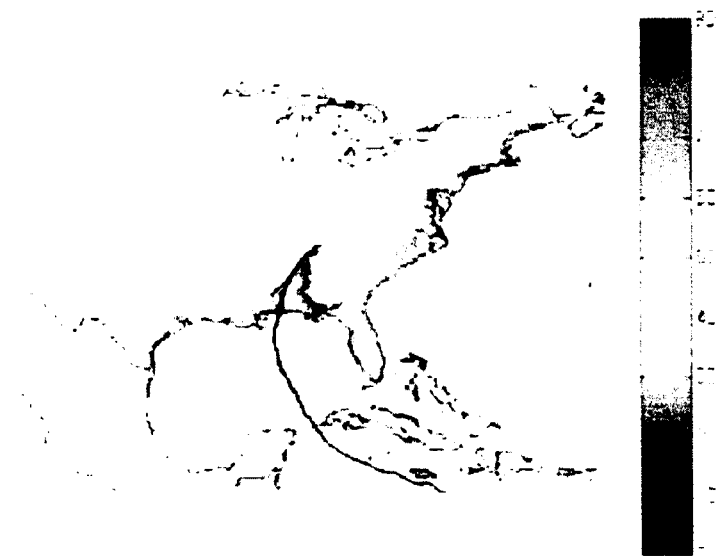
Figure 21:
Figure 22:

FIG. 1 illustrates an architecture that can be used to realise the invention. In this embodiment the automated trigger device for the dynamic triggering of developing and/or imminent tropical storms for integrated monitoring devices and/or control devices and/or early warning systems 10 comprises at least means for generating and transmitting an activating pulse if one or more trigger parameters are exceeded. The trigger device can for example be used generally in technical installations as an early warning system or alarm system 10, in order for example to initiate evacuation of populated areas or regions, to assist or manage police and/or military units, etc. In this connection conventional systems belonging to the prior art can be amplified or can be used as a free-standing device. Various alarm systems belonging to the prior art can likewise be used as control devices 10. In particular they can for example also be used to stabilise stock markets or to stabilise one or more damage cover systems. The term "integrated" should in this connection be understood to mean that the trigger device can be used as an integrated component of complex monitoring devices of the prior art in the management of catastrophes caused by tropical storms, hurricanes, etc. The invention permits for the first time a complete automation of such monitoring devices. The trigger device comprises a trigger module 12 with a network interface, wherein the trigger module 12 is connected via the network interface to measurement devices 40, . . . , 43 distributed in a decentralised manner. Similarly, the monitoring device and/or control device and/or early warning system 10 can include corresponding interfaces. The trigger module 12 can be configured in terms of hardware and/or software. The trigger module 12 and/or monitoring device and/or control device and/or early warning system 10 can include interfaces for use at different network sites and/or different networks. The trigger module 12 can include one or more different physical network interfaces, which can for example support a plurality of different network standards. The physical network interfaces of the trigger module 12 can for example include interfaces with the Ethernet or another wired LAN (local area network), Bluetooth, GSM (global system for mobile communication), GPRS (generalised packet radio service), USSD (unstructured supplementary services data), UMTS (universal mobile telecommunications system) and/or WLAN (wireless local area network), etc. Accordingly, the trigger module 12 can be configured so that it can access various heterogeneous networks 50/51, such as for example a wired LAN, i.e. a local fixed network, in particular also the PSTN (public switched telephone network), etc., a Bluetooth network, e.g. for installations in roofed localities, a mobile radio telephone network with GSM and/or UMTS, etc., or a wireless LAN. The reference numbers 50/51 can in particular denote the customary, worldwide IP backbone network. As already mentioned in part, the communication with the decentralised measurement devices 40, . . . , 43 can be realised via the mobile radio telephone network, for example by means of special short messages, e.g. SMS (short message services), EMS (enhanced message services), via a signalling channel, such as e.g. USSD (unstructured supplementary services data) or other techniques such as MExE (mobile execution environment), GPRS (generalised packet radio service), WAP (wireless application protocol) or UMTS (universal mobile telecommunications system) or via a user channel. By means of the network interface measurement data relating to the developing and/or imminent tropical storm can be transmitted from the at least one decentralised measurement devices 40, ..., 43 to the trigger module 12 and/or monitoring device 10. The communication between the trigger module 12 and/or monitoring device 10 and the measurement devices 40, ..., 43 via the network 50 can be unidirectional (e.g. via broadcast methods, etc.), or bi-directional. The data can be transmitted in encrypted or unencrypted form. Likewise, it may be useful to allow only controlled access to the measurement stations 40, ..., 43. The data transmission can however also take place in a user-independent manner. The trigger module 12 can for example be configured in a decentralised manner as an independent network unit, wherein the monitoring device 10 includes means for periodically accessing and/or accessing on request and/or accessing after predefined time intervals the trigger module 12 via the network 50. Developing and/or imminent tropical storms can be triggered by means of the trigger module 12 and the corresponding information can be transmitted to a monitoring device 10.

The measurement devices 40, ..., 43 are according to the invention arranged in cellular, geographically and/or topologically definable units or zones 401, 411, 421, 431. The units and/or zones of the measurement devices 40, ..., 43 can regionally overlap, be coincident and/or only partially coincident. Since tropical storms can on account of the Coriolis force build up only in two parallel bands around the Equator, it may be advisable to increase and/or adapt the coverage density in these regions. The measurement devices 40, ..., 43 can include for example terrestrial, sea-based or satellite-based measurement devices 40, ..., 43. The measurement devices can include for example measurement sensors that are connected to the measurement device via an air interface or a fixed wired interface or via a contact-equipped interface. The measurement sensors can include sensors for measuring water and/or air temperatures. The units and/or zones involved can for example be dynamically or partly dynamically matched during the occurrence of the tropical storm in order to obtain a better areal resolution. Geophysical, atmospheric and/or maritime measurement parameters are transmitted by means of the network interface from the measurement devices 40, ..., 43 to the trigger module 12 and can be stored in a corresponding memory unit. The trigger module 12 includes a Monte Carlo module 121, wherein a plurality of data records for definable future time intervals can be generated dynamically or partly dynamically by means of the Monte Carlo module 121 on the basis of the transmitted measurement parameters. The Monte Carlo module 121 can be configured in terms of software and/or hardware. The data records include for example physical and/or geographical parameters of a tropical storm. As already mentioned, the measurement stations 40, ..., 43 can include for example satellite-based devices and/or land-supported devices. Measurement stations 40, ..., 43 include the necessary communications means for the transfer of the measurement data to a central unit and/or trigger module 12 and/or monitoring device 10 and/or control device 10 and/or early warning system 10. The measurement stations 40, ..., 43 include the necessary technical measuring means for collecting and compiling the physically relevant data of a tropical storm. The physical parameters can include for example atmospheric pressure, wind strength, atmospheric humidity, precipitation levels, translation velocity, localised or geographical progress of the cyclone, etc. The measurement stations 40, ..., 43 include graphical means, such as for example cameras or other imaging devices, for example in satellites.

The trigger module 12 includes the aforementioned Monte Carlo module 121. The Monte Carlo module 121 can for example generate the data records by dynamic variation of boundary condition parameters based on the respective transmitted measurement data, wherein on the basis of the varied boundary condition parameters a large number of data records relating to the progress of the tropical storm can be generated for definable future time intervals. The Monte Carlo module can for example include means that allow, by means of a statistical or stochastic closest distance method, the most probable values to be determined starting from a selected starting point. These methods can include for example the method of greatest probability, the least squares method, the $_x2$ method, Kolmogorov-Smirnov method, Anderson-Darling method, etc. The purely statistical process steps finish at this point. It should be mentioned that it may be advantageous if the extrapolation module includes one or more statistical process modules, such as for example a Monte Carlo module, a generator for different future models, and/or a variation module for varying the parameters. The modules can choose the parameters for example in such a way that the resultant curve agrees best with the integrated behaviour of all possible scenarios, in which the scenarios have never had to be realised in the past. Conversely, the possibility that the curve does not agree with or does not sufficiently approximate to the behaviour of past events can also be minimised. Statistical data and/or historical data can for example be projected in this way with the modules by means of corresponding models and/or scenarios into the time frame to be determined or can be converted into a parametric curve.

Figure 23:
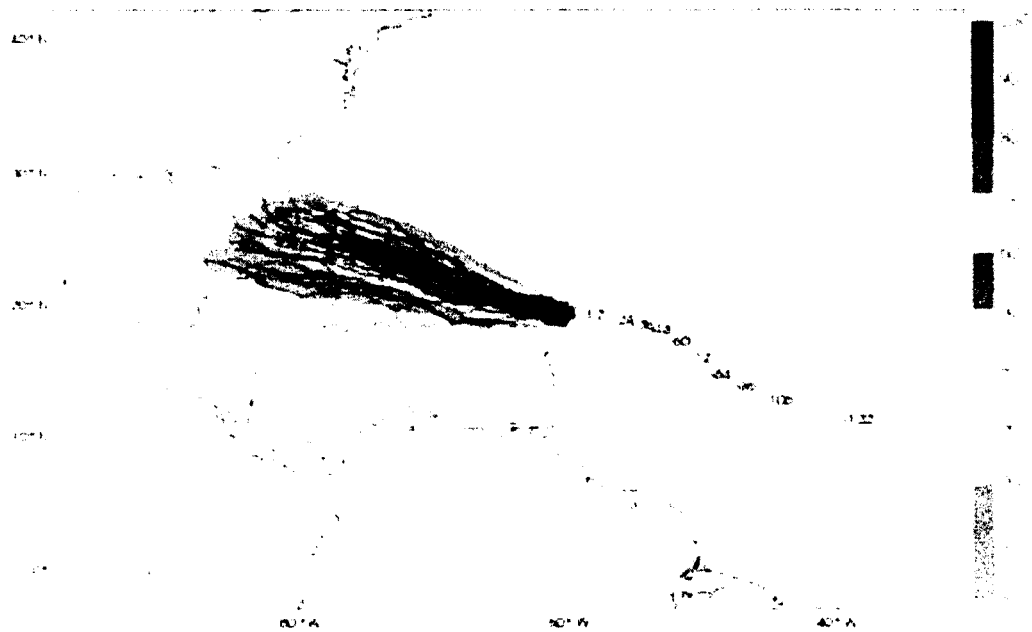
FIG. 23 shows a track determination based on a large number of tracks. The area was determined on the basis of stochastic probability.
Figure 24:
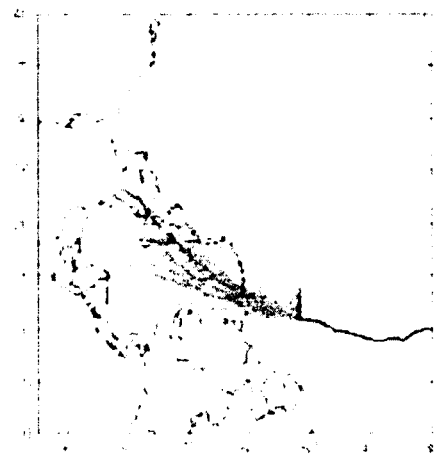
FIGS. 24 to 31 show the determination of the trigger index, and in this case the Pioneer index, by means of the system according to the invention. In contrast to the systems according to the prior art the Pioneer index reaches the final value of 588 basically without any relatively large fluctuations.
Figure 24:
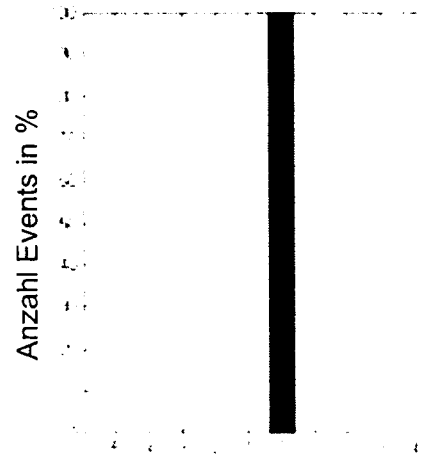
Figure 25:
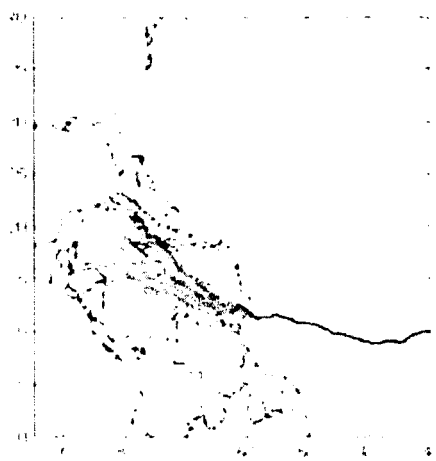
Figure 25:
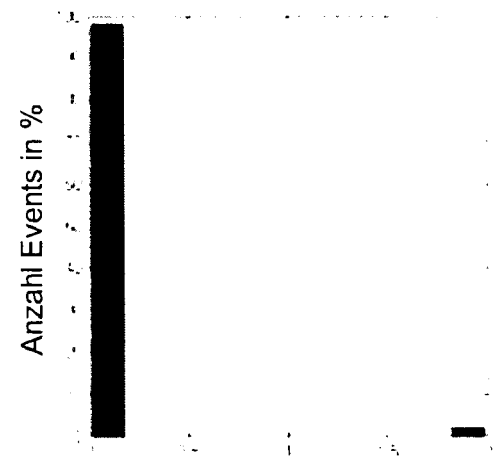
Figure 26:
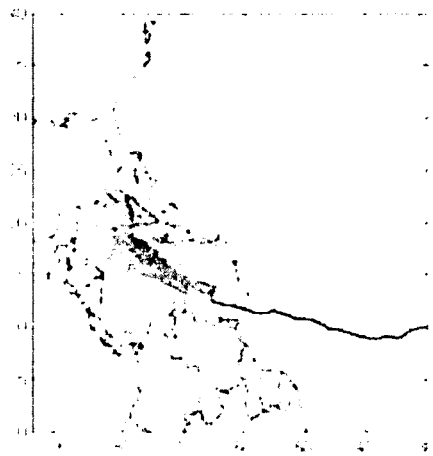
Figure 26:
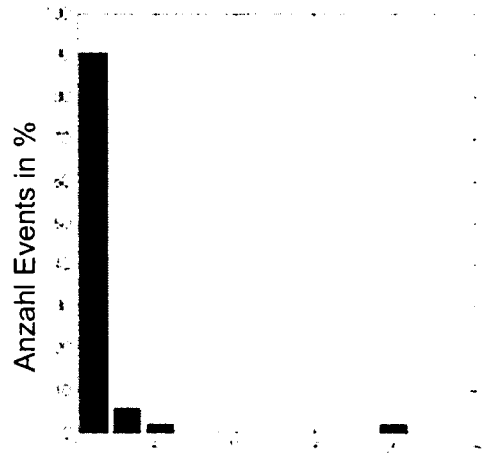
Figure 27:
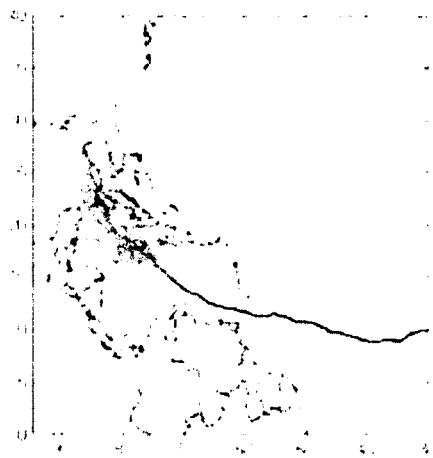
Figure 27:
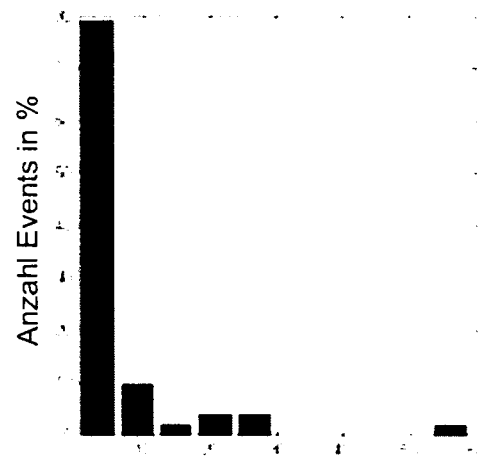
Figure 28:
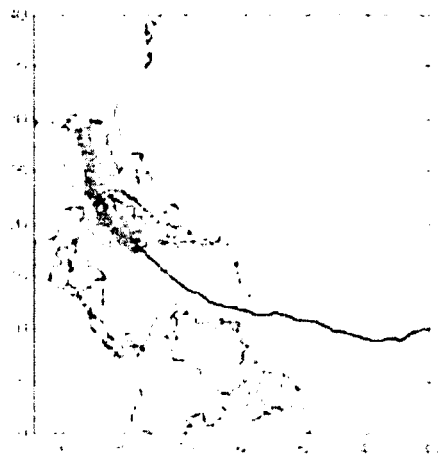
Figure 28:
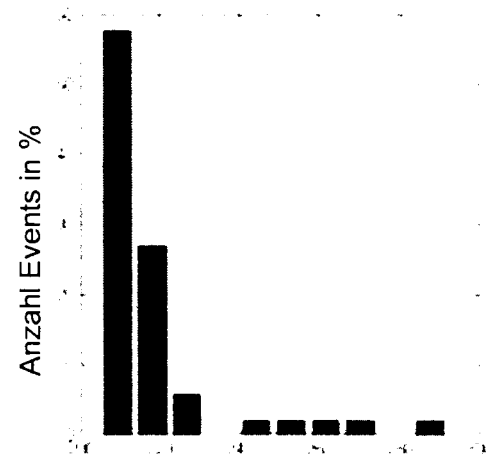
Figure 29:
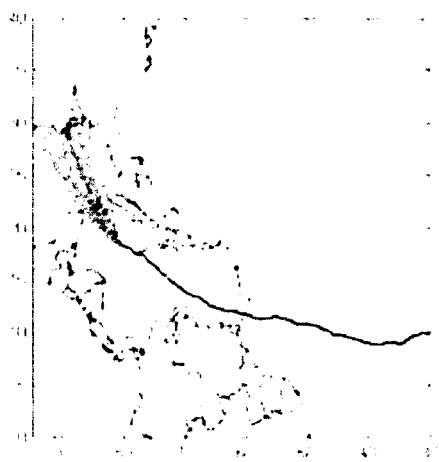
Figure 29:
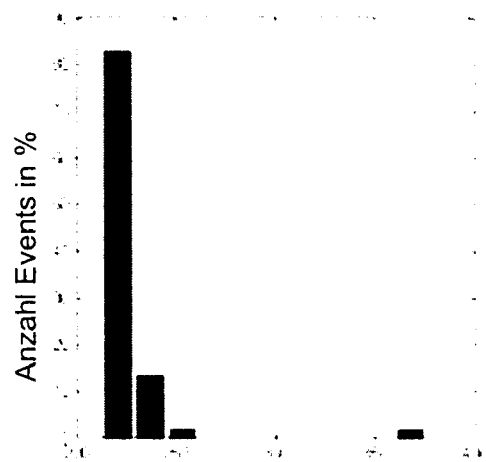

The data records include at least physical and/or geographical parameters of the tropical storm (cyclone). The data records can for example also include topographical parameters. The trigger module 12 and/or the monitoring/control device 10 can for example include means for determining the data records based on air pressure parameters and/or cellular air pressure parameters and/or interpolated cellular air pressure parameters and/or trajectory parameters and/or stochastic parameters. The monitoring/control device 10 and/or the trigger module 12 includes a memory unit 101, wherein by means of the monitoring/control device 10 and/or the trigger module 12 and based on the large number of generated and transmitted data records, probability distribution factors for the physical and/or geographical parameters can be generated and can be stored in an allocated manner in the memory unit. In contrast to the deterministic determination of cyclone track parameters for a future time interval, the determination of the trigger indices with the trigger device according to the invention includes the generation of a large number of possible future cyclone tracks. Each of these cyclone tracks is for example allocated an intensity for each time interval to be determined. The length of time may for example range from 6 hours up to 72 hours. Any other time interval can however also be chosen depending on the application. In contrast to the devices and methods of the prior art involving the deterministic parameter determination, in the system according to the invention quantitative information relating to all possible used simulated and/or historic tracks can be employed. All these tracks thus form a single unit for the determination of the trigger parameters by the monitoring/control device 10 and/or the trigger module 12. In this way probability parameters for example for the individual predictions or parameter determinations can be determined or generated in a quantified manner by the system (cf. FIG. 23). It is clear that the prediction of the parameters becomes more reliable if all the simulated tracks are close to one another, i.e. the probability becomes greater that the specified parameters will actually also be realised. If on the other hand the simulated tracks are widely spread out in relation to one another, then the probability that the predicted parameters will actually be realised is also less.

Expressed in another way, the trigger module 12 includes an extrapolation module 101 for generating and storing track distribution parameters of a track distribution, which can be integrated via the large number of data records, for each of the definable future time intervals. The track distribution can include each of the cellular units 401, 411, 421, 431 or can be appropriately extrapolated by parameterization. The trigger device, for example the trigger module 12 and/or the monitoring/control device 10, includes an activating device 11, by means of which, based on the generated track distribution parameters and/or the trigger parameters, a corresponding control signal can be transmitted to the monitoring/control device 10. By means of the trigger module 12 localised feedback and time-dependent trigger parameters can be generated for example based on the probability distribution factors. The trigger parameters can be transmitted for example to the monitoring/control device 10 and used as appropriate to control an activating device 11. In order to determine the trigger parameters, which for example are and/or include in particular also a CatBond index such as the Pioneer index, the determination of the parameters for each simulated track can be repeated by means of the trigger module 12. This leads to a range of possible and more or less probable values for each trigger parameter. It can thus be said that the trigger system and trigger device 12 according to the invention is based not on individual predicted parameter values, but for each value is based on a correspondingly parameterized distribution or probability distribution. In other words, each used trigger parameter is quantitatively recorded by means of the trigger device according to the invention and acts correspondingly on the whole trigger device. This allows in particular reliable triggers of parameters or trigger parameters to determine what is the risk of an impending damage and/or magnitude of the damage to be expected due to the cyclone. Furthermore the probability of a specific CatBond index value can for the first time be determined in an automated manner with the device. In addition the reliability of the predictions and of the determination of the parameters can be specified quantitatively by means of the trigger device according to the invention and used for example by means of the monitoring/control device 10 as control signals. FIGS. 24 to 31 illustrate the determination of the trigger parameters and in this case the Pioneer index by means of the system according to the invention. In contrast to the systems of the prior art (FIGS. 5 to 22) the Pioneer index determined by the trigger device according to the invention reaches the final value of 588 substantially without any relatively large fluctuations.

As already mentioned, FIGS. 5 to 22 illustrate the time sequence of deterministic track predictions according to the prior art for cyclone Ivan. A new track prediction was published approximately every six hours. The aforementioned FIGS. 5 to 22 show a selection of all the track predictions, but at least one image per day. The resultant Pioneer index (a trigger index according to the prior art) at the respective point in time is likewise shown. The black line shows the observed track position plus 72 hours. The different shades of grey show the wind speed (meters/sec). The first track image was published on 5 Sep. 2004, and the penultimate one was published on 18 Sep. 2004. The last figure shows the final cyclone track of 24 Sep. 2004. The second landfall no longer affected the Pioneer index since the cyclone had already become too weak.

TABLE 1

The development of the Pioneer index ($2^{nd}$ column) of the deterministic systems of the prior art compared with the minimum/maximum development in the system according to the invention ($3^{rd}$ and $4^{th}$ columns).

Figure 30:
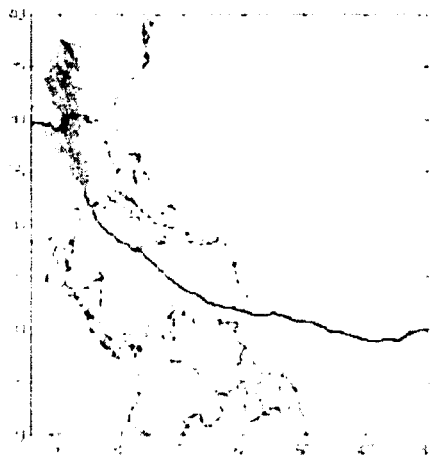
Figure 30:
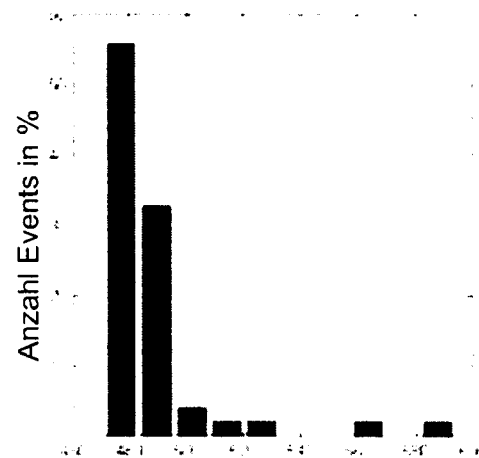
Figure 31:
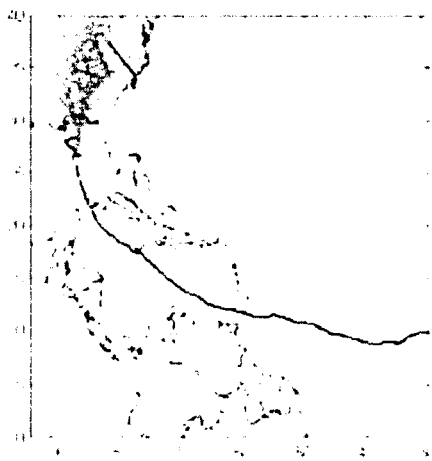
Figure 31:
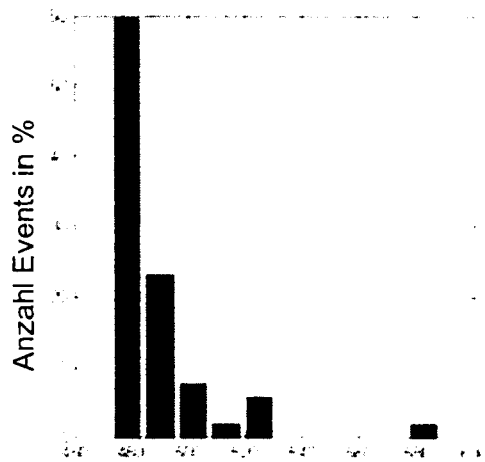

| Date/Time (UTC) | Pioneer Index Value | Minimum (Invention) | Max (Invention) | |
|---|---|---|---|---|
| 2004/09/04 12 h | | 0 | 0 | |
| 2004/09/06 12 h | | 0 | 0 | |
| 2004/09/07 12 h | | 0 | 2 | |
| 2004/09/07 15 h | 2 | | | |
| 2004/09/08 03 h | 408 | | | 408 shows an outlier in the systems of the prior art |
| 2004/09/08 12 h | | 0 | 21 | |
| 2004/09/10 03 h | 2322 | | | 2322 shows an extreme maximum in the systems of the prior art |
| 2004/09/10 12 h | | 0 | 59 | |
| 2004/09/11 12 h | | 200 | 292 | |
| 2004/09/11 15 h | 218 | | | |
| 2004/09/11 21 h | 476 | | | |
| 2004/09/12 09 h | 392 | | | |
| 2004/09/12 12 h | | 210 | 375 | |
| 2004/09/13 03 h | 460 | | | |
| 2004/09/14 03 h | 368 | | | |
| 2004/09/14 09 h | 588 | | | |
| 2004/09/14 12 h | | 470 | 594 | See FIG. 30 |
| 2004/09/14 18 h | 547 | | | |
| 2004/09/15 06 h | 701 | | | |
| 2004/09/15 09 h | 439 | | | |
| 2004/09/15 12 h | | 470 | 588 | |
| 2004/09/15 18 h | 410 | | | |
| 2004/09/16 12 h | 530 | | | |
| 2004/09/16 12 h | | 500 | 901 | 530 becomes highly probable |
| 2004/09/17 03 h | 528 | | | |
| 2004/09/18 | 528 | | | |

The date in column 1 is given in the format yyyy/mm/dd, i.e. year/month/day, and the time as UTC (coordinated universal time), zulu or Z time (GMT time zone (Greenwich Mean Time) of the zero degree of longitude), and h denotes hours.

The trigger module 12 can be configured as an integrated constituent of the monitoring/control device 10, as well as an independent free-standing network unit connected to the activating device 11. Likewise, the trigger module 12 can be configured as an integrated constituent of the monitoring device 10, as well as an independent free-standing network unit connected to the extrapolation module. It is important to point out that the monitoring device 10 can be related in particular for example to multi-stage damage cover systems 20/30. Such multi-stage damage cover systems include at least a second stage 30 based on sums of money transmitted from user units and stored in a memory unit 31, which can be activated if a predefined damage limit threshold value is exceeded. The trigger module 12 and/or the activating device 11 can include for example at least one determinable threshold value, wherein if the at least one threshold value is exceeded by one and/or cumulative trigger indices, then account data including account parameters for crediting and/or debiting sums of money can be transmitted in an automated manner to a clearing module 70 by means of the trigger device 12 or the monitoring device 10. For example in the case of transmitted sums of money, monies transferred by the clearing module 70 from user units can be collated and recorded at least in part by means of the trigger system and allocated to the monitoring device 10 or released for another user. The monitoring device 10 can for example include a user profile based on user information, wherein by means of the monitoring device 10 user data can be generated based on the trigger parameters and can be selected based on the user profile. The user data can be transmitted from the monitoring device 10 via a network 50/51 to a communications device 60/61/62 of a user. The communications device 60/61/62 can for example be any mobile or stationary network code. Mobile codes are understood to include inter alia all possible so-called customer premises equipment (CPE) that are provided for use at different network sites and/or on different networks. The mobile CPEs or codes 60/61/62 have one or more different physical network interfaces, which can also support several different network standards. The physical network interfaces of the mobile node can include for example interfaces with the Ethernet or another wired LAN (local area network), Bluetooth, GSM (global system for mobile communication), GPRS (generalised packet radio service), USSD (unstructured supplementary services data), UMTS (universal mobile telecommunications system) and/or WLAN (wireless local area network) etc. The user profile can for example be generated at least in part dynamically, wherein parts of the data of the user profile can be modified by the user. The user profile can for example be stored, permanently allocated to a user, in the monitoring device 10. The user data can for example be generated at least in part dynamically, in which the dynamic generation is carried out at least in part based on the data of the user profile. In particular the monitoring device 10 can include for example various user profiles, stored in an allocated manner, for different communications devices 60/61/62 of the user. The data of the various user profiles can for example be determined at least in part by the user themselves. The user profile can for example additionally include access condition data, by means of which the monetary value of a credit limit that can be specified by the user and/or the monitoring device 10 can be detected, up to which credit limit the account parameters for crediting and/or debiting sums of money can be transmitted in an automated manner to the clearing module 70.

In order to restrict access to the communications devices 60, . . . , 62 to authorised users, mechanisms for example in the ETSI standards for access-controlled programs and/or data (services), so-called conditional access, can be used. Other systems and methods of the prior art are of course also possible. In particular, scrambling/descrambling procedures (encryption/de-encryption), parameters for the signalling and synchronisation of conditional access as well as mechanisms for the monitoring and distribution of authorizations (authorization data for users) by the transmission of so-called ECM messages (entitlement checking messages) and EMM messages (entitlement management messages) are described in the aforementioned ETSI standards. According to the aforementioned ETSI standards a conditional access flag and/or a conditional access identifier is used for each of the sent service components, in order to notify the receiver whether the relevant service component employs conditional access mechanisms or not, and if so what types of mechanisms are used. For service components that are in a controlled access mode and that are identified in this text as access-controlled programs and/or data, the data of the relevant service component (which can refer to programs and/or data) are encrypted with a control word, wherein this control word is regularly changed and is in turn transmitted by a session key, encrypted in the ECM messages, to the communications devices 60, . . . , 62. The access control module, the so-called access control system, used for all service components of a service is according to the aforementioned ETSI standards identified by the conditional access identifier, wherein the access control system can interpret and process the ECM and EMM messages transmitted by the broadcast transmitter/base station 55. If the communications devices 60, . . . , 62 are configured at least in part as IP nodes, then the corresponding methods used in the IP field should be employed.

The trigger module 12 and/or the activating device 11 can for example include at least one determinable threshold value, wherein if the at least one threshold value is exceeded by one and/or cumulative trigger parameters, the user data can be transmitted from the monitoring device to one or more communications device 60/61/62 by users. In addition parameters for crediting transferred sums of money can be allocated in an automated manner to the second stage of damage cover systems 30 of a user unit, for example by means of the monitoring device 10 based on the transmitted trigger parameters and at least one threshold value.

LIST OF REFERENCE NUMERALS

10 Monitoring device/control device/early warning system
11 Activating device
12 Trigger module
121 Monte Carlo module
20 Damage cover system, first stage
30 Damage cover system, second stage
31 Memory unit
40, . . . , 43 Measurement devices
401, 411, 421, 431 Cellular units
50/51 Network
55 Broadcast transmitter/base station
60/61/62 Communications device
70 Clearing module

The invention claimed is:

1. An early warning system for developing and imminent tropical storms, comprising:
an automated trigger device including means for generating and transmitting an activating pulse after a trigger parameter is exceeded, and
measurement devices distributed in a decentralized manner, the activating pulse sent to the measurement devices to request at least one of geophysical, atmospheric, and maritime measurement parameters by a standardized message,
wherein the measurement devices are arranged in at least one of cellular, geographically, and topologically definable units or zones, and the at least one of geophysical, atmospheric, and maritime measurement parameters of the measurement devices are transferred via a network interface to and stored in a trigger module of the trigger device,
the measurement devices for measuring the measurement parameters include measurement sensors that are connected to the measurement devices via an air interface or a fixed wired interface or via an interface including contacts,
the trigger module includes a Monte Carlo module for dynamic generation of a plurality of data records including at least one of physical and geographical parameters of a tropical storm for definable future time intervals based on the transmitted measurement parameters, and wherein the trigger device includes means for dynamic variation of boundary condition parameters of the data records based on the transmitted measurement parameters,
the trigger module includes an extrapolation module for generating and storing track distribution parameters of a track distribution, which are integrated via the plurality of the data records, for each of the definable future time intervals, wherein the track distribution includes each of the at least one of cellular, geographically, and topologically definable units or zones and are extrapolated according to parameterization of the at least one of cellular, geographically, and topologically definable units or zones, and the trigger device includes an activating device, the early warning system being activated by the activating device in response to at least one of the generated track distribution parameters meeting a predetermined criteria and the trigger parameter meeting a predetermined criteria, the trigger parameter including a catastrophe bond index corresponding to a predetermined range of values.

2. The early warning system according to claim 1, wherein the at least one of cellular, geographically, and topologically definable units or zones are dynamically matched during occurrence of the tropical storm.

3. The early warning system according to claim 1, wherein the transmission of the measurement parameters from the measurement devices to the trigger module takes place periodically and on request by the trigger module after predefinable threshold values are exceeded.

4. The early warning system according to claim 1, wherein the measurement sensors include sensors for measuring at least one of water and air temperature.

5. The early warning system according to claim 1, wherein the track distribution parameters include a definable probability parametrization over the cellular units.

6. The early warning system according to claim 1, wherein the monitoring device includes means for triggering multistage damage cover systems, which multistage damage cover systems include at least a second stage based on sums of money transferred from user units and stored in a memory unit, which can be activated after a predefined damage limit threshold value is activated.

7. The early warning system according to claim 1, wherein the early warning system includes a user profile based on stored user information, and user data is generated based on the trigger parameter and is selected based on the user profile, and the user data is transmitted from the early warning system via a network to a communications device of a user.

8. The early warning system according to claim 7, wherein the activating device includes a determinable threshold value, and after the threshold value is exceeded by a cumulative trigger parameter, the user data is transmitted from the early warning system to one or more communications devices of users.

9. The early warning system according to claim 1, wherein the data records include at least one of geographical and topological parameters.

10. The early warning system according to claim 1, wherein the trigger module is configured in a decentralized manner as an independent network unit, and the early warning system further includes:

means for accessing the trigger module via the network based on at least one of periodically, on request, and after predefined time intervals.

11. The early warning system according to claim 1, wherein the trigger module includes means for determining the data records based on at least one of air pressure parameters, cellular air pressure parameters, interpolated cellular air pressure parameters, trajectory parameters, and stochastic parameters.

12. An automated early warning method for dynamically triggering developing and imminent tropical storms, the method comprising:

generating, by a trigger module of a trigger device, an activating pulse after a trigger parameter is exceeded, the activating pulse configured to request at least one of geophysical, atmospheric, and maritime measurement parameters by a standardized message from measurement devices;

transmitting the activating pulse to the measurement devices, wherein the measurement devices are arranged in a decentralized manner in at least one of cellular, geographically, and topologically definable units or zones;

transmitting from the measurement devices, by a network interface, at least one of geophysical, atmospheric, and maritime measurement parameters to the trigger module, and storing the at least one of geophysical, atmospheric, and maritime measurement parameters at the trigger module, wherein the measurement devices include measurement sensors that are connected to the measurement devices via an air interface or a fixed wired interface or via an interface provided with contacts;

dynamically generating, by a Monte Carlo module of the trigger module, a plurality of data records including at least one of physical and geographical parameters of a tropical storm for definable future time intervals based on the transmitted measurement parameters, wherein boundary condition parameters of the data records are dynamically varied based on the transmitted measurement parameters;

generating and storing in an allocated manner, by an extrapolation module of the trigger module, track distribution parameters of a track distribution that are integrated via the plurality of the data records for each of the definable future time intervals, wherein the track distribution includes each of the at least one of cellular, geographically, and topologically definable units or zones and is extrapolated according to parameterization of the at least one of cellular, geographically, and topologically definable units or zones; and activating an early warning system, by an activating device of the trigger device, in response to at least one of the generated track distribution parameters meeting a predetermined criteria and the trigger parameter meeting a predetermined criteria, the trigger parameter including a catastrophe bond index corresponding to a predetermined range of values.

13. The automated early warning method according to claim 12, wherein the at least one of cellular, geographically and topologically definable units or zones are dynamically adapted by the system during occurrence of the tropical storm.

14. The automated early warning method according to claim 12, further comprising the step of transmitting the measurement parameters from the measurement devices to the trigger module periodically and on request by the trigger module after a predefinable threshold value is exceeded.

15. The automated early warning method according to claim 12, wherein the measurement sensors include sensors for measuring at least one of water and air temperatures.

16. The automated early warning method according to claim 12, wherein the track distribution parameters include a definable probability parametrization over the cellular units.

17. The automated early warning method according to claim 12, wherein multistage damage cover systems are activated by the early warning system, and include at least a second stage based on sums of money transferred from user units and stored in a memory unit, which stage can be activated after a predefined damage limit threshold value is exceeded.

18. The automated early warning method according to claim 12, wherein a user profile is established based on user information, wherein by the early warning system, user data is generated based on the trigger parameter and is selected based on the user profile, and the user data is transmitted from the early warning system via a network to a communications device of a user.

19. The automated early warning method according to claim 18, wherein after a threshold value is exceeded by a cumulative trigger parameter, the user data is transmitted from the early warning system to one or more communications devices of users.

20. The automated early warning method according to claim 12, wherein the data records include at least one of geographical and topological parameters.

21. The automated early warning method according to claim 12, wherein the trigger module is configured in a decentralized manner as an independent network unit, and the early warning system accesses the trigger module via the network based on at least one of periodically, on request, and after predefined time intervals.

22. The automated early warning method according to claim 12, wherein the trigger module determines the data records based on at least one of air pressure parameters, cellular air pressure parameters, interpolated cellular air pressure parameters, trajectory parameters, and stochastic parameters.

* * * * *

UNITED STATES PATENT AND TRADEMARK OFFICE
CERTIFICATE OF CORRECTION

PATENT NO. : 8,354,933 B2  
APPLICATION NO. : 12/093861  
DATED : January 15, 2013  
INVENTOR(S) : David Bresch et al.

Page 1 of 1

It is certified that error appears in the above-identified patent and that said Letters Patent is hereby corrected as shown below:

On the title page, Item (30), the Foreign Application Priority data is incorrect. Item (30) should read:

-- (30) Foreign Application Priority Data

Nov. 15, 2005 (CH) ........................... PCT/CH05/00679 --

Signed and Sealed this
Twenty-sixth Day of March, 2013

Teresa Stanek Rea
*Acting Director of the United States Patent and Trademark Office*